United States Patent Office 3,654,296
Patented Apr. 4, 1972

3,654,296
2-CHLOROBENZOTHIAZOLECARBOXAMIDES
William A. Bolhofer, Frederick, Pa., assignor to
Merck & Co., Inc., Rahway, N.J.
No Drawing. Filed Jan. 10, 1969, Ser. No. 790,458
Int. Cl. C07d 91/44
U.S. Cl. 260—304
15 Claims

ABSTRACT OF THE DISCLOSURE 2-chlorobenzothiazolecarboxamides, useful new agents for inhibiting gastric acid secretion, are prepared by reacting 2 - chlorobenzothiazolecarbonyl halide with an amino compound of the general formula $R_1$—NH—$R_2$ where $R_1$ and $R_2$ are hydrogen, alkyl, cycloalkyl, alkenyl, hydroxyalkyl, alkoxyalkyl, dialkylaminoalkyl, aryl, aralkyl or with a 5 or 6-membered heterocyclic compound formulated by joining $R_1$ and $R_2$ with or without the inclusion of hetero atoms such as O, N, S.

BACKGROUND OF THE INVENTION

Field of the invention

The present invention relates to the preparation of novel 2 - chlorobenzothiazolecarboxamides that inhibit gastric acid secretion in mammals, and more particularly relates to novel 2 - chlorobenzothiazoles having an unsubstituted or substituted carbamoyl group at position 4, 5, 6 or 7.

Description of the prior art

Two types of products are usually employed to control gastric acidity and to inhibit gastric secretion in mammals. These materials are mainly either anticholinergic agents or antacids. The anticholinergic agents have the disadvantage in that they act via the nervous system by blocking the nerve impulses to the cells of the gastric mucosa responsible for secretion of acid. Because of their effect on the nervous system, the anticholinergic agents are non-specific, additionally affecting other secretory mechanisms of the body as well as other body functions depending in whole or in part on stimulation by the nervous system. Antacid compounds, on the other hand, have limited effectiveness, require large dosages and act only to neutralize the acid after it has been secreted in the stomach, and furthermore, have a very short duration of activity.

SUMMARY OF THE INVENTION

The general purpose of this invention is to provide novel 2 - chlorobenzothiazolecarboxamides which have the specific property of inhibiting gastric acid secretion. The novel compounds effectively inhibit acid secretion for a period of hours and have special value in the prophylaxis and treatment of peptic ulcers. Pharmacological studies indicate that the benzothiazolecarboxamides of this invention are effective in inhibiting histamine stimulated gastric secretion, an important property not shared with other types of gastric acid inhibitors presently in clinical use.

An object of the present invention is to provide new 2 - chlorobenzothiazolecarboxamides which inhibit gastric acid secretion.

Another object is to provide a process for preparing 2-chlorobenzothiazolecarboxamides.

Still another object is to provide new compounds and compositions effective for treating gastric acid secretion.

DESCRIPTION OF THE PREFERRED EMBODIMENTS

The novel compounds of this invention are 2 - chlorobenzothiazoles having a carbamoyl group at position 4, 5, 6 or 7. These compounds are described by the general Formula I, wherein $R_1$ and $R_2$ may be hydrogen or alkyl, cycloalkyl, alkenyl, hydroxyalkyl, alkoxyalkyl, dialkylaminoalkyl, aryl, aralkyl and, in addition, $R_1$ and $R_2$ may be joined to form a 5 or 6-membered heterocyclic ring, which may include O, S or N atoms in addition to the carbamoyl nitrogen atom. The carbon atoms of the above $R_1$ and $R_2$ groups may be further substituted if desired.

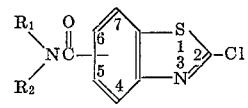

Particularly preferred are those compounds where $R_1$ and $R_2$ are: hydrogen, loweralkyl such as methyl, ethyl, isopropyl, butyl, hexyl, and the like; cycloalkyl having 4–8 carbon atoms such as cyclohexyl, cyclopentyl and the like; loweralkenyl such as allyl, 2-butenyl and the like; hydroxyloweralkyl such as 2-hydroxyethyl, 2-hydroxypropyl, 3-hydroxypropyl, 4-hydroxybutyl and the like; alkoxyalkyl such as 2-methoxyethyl, 2-ethoxyethyl and the like; diloweralkylaminoalkyl such as 3 - dimethylaminopropyl, 2 - methylethylaminoethyl, 2-diethylaminoethyl, 4-dimethylaminobutyl, 2-diethylaminopropyl and the like; aryl such as tolyl, xylyl, phenyl, p-chlorophenyl and the like; arylloweralkyl such as benzyl, phenethyl, p-chlorobenzyl, 2-phenylpropyl and the like; and where $R_1$ and $R_2$ are joined to form a 5 or 6-membered heterocycle incorporating the carbamoyl nitrogen and with or without the inclusion of an O, S or N atom, the heterocyclic groups are pyrrolidino, piperidino, morpholino, thiomorpholino, piperazino, N-methylpiperazino, imidazolyl, imidazolinyl, imidazolidinyl, pyrrolyl, oxazolinyl, oxazolidinyl, thiazolinyl, thiazolidinyl and the like.

$R_1$ and $R_2$ may represent the same or different substituents. Preferred embodiments are mono and dialkyl substituted carboxamides where $R_1$ and $R_2$ are hydrogen and/or loweralkyl substituents attached to the carbamoyl group and particularly where $R_1$ and $R_2$ are both unsubstituted loweralkyl. Especially useful compounds of the class represented by Formula I are those in which $R_1$ and $R_2$ are the same loweralkyl substituents having one or two carbons, specifically 2-chloro-N,N-dimethyl-5-benzothiazolecarboxamide and 2-chloro-N,N-diethyl-5-benzothiazolecarboxamide.

The novel 2-chlorobenzothiazolecarboxamides of this invention are prepared by intimately contacting 2-chlorobenzothiazolecarbonyl chloride (the carbonyl halide group being attached to position 4, 5, 6 or 7) with a primary or secondary amino compound of the general formula

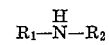

where $R_1$ and $R_2$ are hydrogen, alkyl, cycloalkyl, alkenyl, hydroxyalkyl, alkoxyalkyl, dialkylaminoalkyl, aryl, aralkyl, or, where $R_1$ and $R_2$ are joined, a 5 or 6-membered heterocyclic ring which may include, in addition to the carbamoyl nitrogen atom, O, S or N atoms.

The reaction may be schematically represented as:

a. 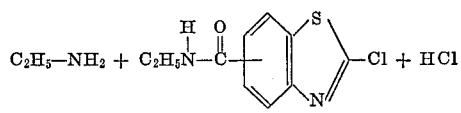

b. 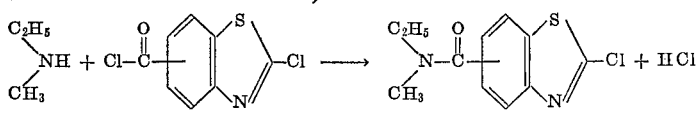

c. 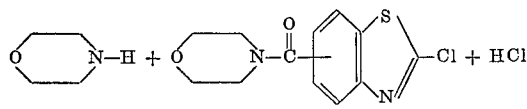

The position of the carbamoyl group depends on the position of the carbonyl halide substituent of the reactant. The carbamoyl substituents depend upon the type of amino compound employed as a reactant.

Thus, when a primary amine as in "a" is used, a 2-chlorobenzothiazole is formed, containing a mono-substituted carbamoyl group in either the 4, 5, 6 or 7-position depending on the position of the carbonyl halide substituent on the reactant. When a secondary amine as in "b" is used, a disubstituted carbamoyl group is formed, the substituent being the same or different depending on the amine substituents. When a heterocyclic compound containing an acylatable ring nitrogen atom is used, a 2-chlorobenzothiazole is formed, having in either the 4, 5, 6 or 7-position a carbamoyl group in which the nitrogen atom constitutes an integral part of the heterocyclic ring.

It is to be noted that for each mole of amine reacting with a mole of benzothiazolecarbonyl chloride, a mole of hydrogen chloride is formed as a by-product. Although not necessary, it is preferable to neutralize the hydrogen chloride during the course of the reaction. One method consists of the addition of a second mole of amine to the reaction mixture. This amine advantageously is the same amine as is being used to form the amide. It can also be a different amine provided it is of the trisubstituted type not capable of forming an amide. Alternatively, other bases such as sodium or potassium bicarbonates are suitable for neutralizing the by-product acid.

The reaction of equimolar amounts of dibasic-amines such as dialkylaminoalkylamines with benzothiazolecarbonyl chloride does not require additional amine for neutralization of the by-product hydrogen chloride.

From the above description it is apparent that a wide variety of 4, 5, 6 or 7- carbamoyl or substituted carbamoyl-2-chlorobenzothiazoles are prepared according to the above-described process by using known amines which have at least one replaceable hydrogen on the nitrogen atom.

While temperature is not a critical or limiting feature in this process, a preferred embodiment is to carry out the reaction at room temperature, although higher or lower temperatures may be used.

Although the preferred embodiment utilizes a solvent media, it is not necessary, and the reaction will proceed in its absence. Suitable organic solvents which may be used, however, include chloroform, methylene dichloride, ether, benzene, toluene and the like.

Representative of the novel 2-chloro-4,5,6- or 7-benzothiazolecarboxamides of this invention are:

2-chloro-4-benzothiazolecarboxamide,
2-chloro-5-benzothiazolecarboxamide,
2-chloro-6-benzothiazolecarboxamide,
2-chloro-7-benzothiazolecarboxamide;

those product prepared from alkylamines such as 2-chloro-N-methyl-5-benzothiazolecarboxamide,
2-chloro-N-ethyl-4-benzothiazolecarboxamide,
2-chloro-N-propyl-6-benzothiazolecarboxamide,
2-chloro-N-butyl-7-benzothiazolecarboxamide,
2 - chloro - N - amyl-5-benzothiazolecarboxamide and the like;

those products prepared from cycloalkylamines such as 2-chloro-N-cyclobutyl-5-benzothiazolecarboxamide,
2-chloro-N-cyclopentyl-4-benzothiazolecarboxamide,
2-chloro-N-cyclohexyl-6-benzothiazolecarboxamide,
2-chloro - N - cyclooctyl-7-benzothiazolecarboxamide and the like;

those products prepared from alkenylamines such as 2-chloro-N-allyl-5-benzothiazolecarboxamide,
2-chloro-N-(3-butenyl)-4-benzothiazolecarboxamide,
2-chloro - N - allyl-7-benzothiazolecarboxamide, and the like;

those products prepared from dialkylamines such as 2-chloro-N,N-dimethyl-4-benzothiazolecarboxamide,
2-chloro-N,N-diethyl-5-benzothiazolecarboxamide,
2-chloro-N,N-dipropyl-7-benzothiazolecarboxamide,,
2-chloro-N,N-dibutyl-6-benzothiazolecarboxamide,
2-chloro-N,N-diamyl-5-benzothiazolecarboxamide,
2-chloro-N-ethyl-N-methyl-4-benzothiazolecarboxamide,
2-chloro-N-methyl-N-propyl-6-benzothiazolecarboxamide,
2 - chloro-N-butyl-N-methyl-7-benzothiazolecarboxamide,
2-chloro-N-amyl-N-methyl-5-benzothiazolecarboxamide,
2-chloro-N-ethyl-N-propyl-5-benzothiazolecarboxamide,
2-chloro-N-butyl-N-ethyl-7-benzothiazolecarboxamide and the like;

those products prepared from hydroxyalkylamines such as 2-chloro-N-(2-hydroxyethyl)-5-benzothiazolecarboxamide,
2-chloro-N-(3-hydroxypropyl)-4-benzothiazolecarboxamide,
2-chloro N - (2-hydroxy-1-methylethyl)-6-benzothiazolecarboxamide,
2-chloro-N-(2-hydroxypropyl)-7-benzothiazolecarboxamide,
2-chloro-N-(2-hydroxy-2-methylpropyl)-5-benzothiazolecarboxamide,
2-chloro-N-(3-hydroxy-2-methylpropyl)-5-benzothiazolecarboxamide,
2-chloro-N-(3-hydroxybutyl)-6-benzothiazolecarboxamide,
2-chloro-N-(4-hydroxybutyl)-7-benzothiazolecarboxamide, 2-chloro-N-(1,1-diethyl-2-hydroxyethyl)-4-benzothiazolecarboxamide,
2-chloro-N-(3-hydroxy-1,1,2-trimethylpropyl)-5-benzothiazolecarboxamide,
2-chloro-N-(5-hydroxypentyl)-6-benzothiazolecarboxamide,
2-chloro-N-(2-ethyl-1-hydroxymethylbutyl)-7-benzothiazolecarboxamide and the like;

those products prepared from alkoxyalkylamines such as 2-chloro-N-(2-methoxyethyl)-4-benzothiazolecarboxamide,
2-chloro-N-(2-ethoxyethyl)-4-benzothiazolecarboxamide,
2-chloro-N-(3-methoxypropyl)-5-benzothiazolecarboxamide,
2-chloro-N-(3-isopropoxypropyl)-6-benzothiazolecarboxamide and the like;

those products prepared from N-hydroxyalkyl-N-alkylamines such as 2-chloro-N-(2-hydroxyethyl)-N-methyl-5-benzothiazolecarboxamide,
2-chloro-N-ethyl-N-(2-hydroxyethyl)-4-benzothiazolecarboxamide,
2-chloro-N-(2-hydroxyethyl)-N-propyl-6-benzothiazolecarboxamide,
2-chloro-N-(2-hydroxyethyl)-N-isopropyl-7-benzothiazolecarboxamide,
2-chloro-N-butyl-N-(2-hydroxyethyl)-6-benzothiazolecarboxamide,
2-chloro-N-(2-hydroxyethyl)-N-isobutyl-7-benzothiazolecarboxamide,
2-chloro-N-(2-hydroxyethyl)-N-tert-butyl-4-benzothiazolecarboxamide,
2-chloro-N-butyl-N-(1,1-dimethyl-2-hydroxyethyl)-5-benzothiazolecarboxamide,
2-chloro-N-sec-butyl-N-(1,1-dimethyl-2-hydroxyethyl)-7-benzothiazolecarboxamide,
2-chloro-N-(1-ethyl-2-hydroxyethyl)-N-(1-ethylpropyl)-6-benzothiazolecarboxamide,
2-chloro-N-(1-ethyl-2-hydroxyethyl)-N-(1,3-dimethylbutyl)-4-benzothiazolecarboxamide,
2-chloro-N-(3-hydroxypropyl)-N-methyl-4-benzothiazolecarboxamide,
2-chloro-N-ethyl-N-(3-hydroxy-2-methylpropyl)-5-benzothiazolecarboxamide,
2-chloro-N-methyl-N-(1-ethyl-3-hydroxy-2-methylpropyl)-6-benzothiazolecarboxamide,
2-chloro-N-methyl-N-(2,2-dimethyl-3-hydroxypropyl)-7-benzothiazolecarboxamide,
2-chloro-N-methyl-N-(1,2-dimethyl-3-hydroxypropyl)-5-benzothiazolecarboxamide,
2-chloro-N-(1,3-dimethyl-3-hydroxybutyl)-N-methyl-4-benzothiazolecarboxamide,
2-chloro-N-(4-hydroxybutyl-N-methyl-6-benzothiazolecarboxamide,
2-chloro-N-ethyl-N-(4-hydroxybutyl)-7-benzothiazolecarboxamide,
2-chloro-N-ethyl-N-(4-hydroxypentyl)-5-benzothiazolecarboxamide,
2-chloro-N-(1,3-dimethyl-4-hydroxybutyl)-N-methyl-5-benzothiazolecarboxamide,
2-chloro-N-(1,1-dimethyl-4-hydroxybutyl)-N-methyl-4-benzothiazolecarboxamide,
2-chloro-N-(1-ethyl-4-hydroxy-1-methylbutyl)-N-methyl-6-benzothiazolecarboxamide,
2-chloro-N-(5-hydroxypentyl)-N-methyl-7-benzothiazolecarboxamide;

those products prepared from dialkylaminoalkylamines such as 2-chloro-N-(2-dimethylaminoethyl)-5-benzothiazolecarboxamide,
2-chloro-N-(2-diethylaminoethyl)-4-benzothiazolecarboxamide,
2-chloro-N-[2-(N-butyl-N-methylamino)ethyl]-6-benzothiazolecarboxamide,
2-chloro-N-(2-dipropylaminoethyl)-7-benzothiazolecarboxamide,
2-chloro-N-(2-diisopropylaminoethyl)-5-benzothiazolecarboxamide,
2-chloro-N-(2-dibutylaminoethyl)-5-benzothiazolecarboxamide,
2-chloro-N-(2-diisobutylaminoethyl)-4-benzothiazolecarboxamide,
2-chloro-N-(2-dimethylaminopropyl)-7-benzothiazolecarboxamide,
2-chloro-N-(2-diethylaminopropyl)-6-benzothiazolecarboxamide,
2-chloro-N-(2-diethylamino-3-methylbutyl)-4-benzothiazolecarboxamide,
2-chloro-N-(3-dimethylaminopropyl)-5-benzothiazolecarboxamide,
2-chloro-N-(3-diethylaminopropyl)-6-benzothiazolecarboxamide,
2-chloro-N-(3-dibutylaminopropyl)-7-benzothiazolecarboxamide,
2-chloro-N-(3-diethylamino-2,2-dimethylpropyl)-5-benzothiazolecarboxamide,
2-chloro-N-(3-dimethylamino-2,2-dimethylpropyl)-6-benzothiazolecarboxamide,
2-chloro-N-[2,2-dimethyl-3-(N-methyl-N-propylamino)propyl]-7-benzothiazolecarboxamide,
2-chloro-N-[2,2-dimethyl-3-(N-isopropyl-N-propylamino)propyl]-4-benzothiazolecarboxamide,
2-chloro-N-(4-dimethylaminobutyl)-5-benzothiazolecarboxamide,
2-chloro-N-(4-diethylaminobutyl)-4-benzothiazolecarboxamide,
2-chloro-N-(4-diethylamino-1-methylbutyl)-6-benzothiazolecarboxamide,
2-chloro-N-(4-dimethylamino-2-methylbutyl)-7-benzothiazolecarboxamide, and the like;

those products prepared from N-dialkylaminoalkyl-N-alkylamines such as 2-chloro-N-(2-dimethylaminoethyl)-N-methyl-4-benzothiazolecarboxamide,
2-chloro-N-ethyl-N-(2-dimethylaminoethyl)-5-benzothiazolecarboxamide,
2-chloro-N-(2-diethylaminoethyl)-N-methyl-6-benzothiazolecarboxamide,
2-chloro-N-(2-diethylaminoethyl)-N-ethyl-7-benzothiazolecarboxamide,
2-chloro-N-(2-dimethylaminopropyl)-N-methyl-5-benzothiazolecarboxamide,
2-chloro-N-(1,1-dimethyl-2-diethylaminoethyl)-N-methyl-4-benzothiazolecarboxamide,
2-chloro-N-(3-dimethylaminopropyl)-N-methyl-6-benzothiazolecarboxamide,
2-chloro-N-(3-diethylaminopropyl)-N-methyl-7-benzothiazolecarboxamide,
2-chloro-N-(1-methyl-4-diethylaminobutyl)-N-propyl-6-benzothiazolecarboxamide,
2-chloro-N-(2,2-dimethyl-3-diethylaminopropyl)-N-methyl-5-benzothiazolecarboxamide and the like;

those products prepared from N,N-di(dialkylaminoalkyl)amines such as 2-chloro-N,N-bis(dimethylaminoethyl)-4-benzothiazolecarboxamide and the like;

those products prepared from bis(hydroxyalkyl)amines such as 2-chloro-N,N-bis(2-hydroxyethyl)-5-benzothiazolecarboxamide,
2-chloro-N-(2-hydroxyethyl)-N-(2-hydroxypropyl)-6-benzothiazolecarboxamide, 2-chloro-N-(2-hydroxybutyl)-N-(2-hydroxyethyl)-7-benzothiazolecarboxamide,
2-chloro-N-(2-hydroxyethyl)-N-(3-hydroxy-1-methylbutyl)-5-benzothiazolecarboxamide,
2-chloro - N - (1-ethyl-2-hydroxyethyl)-N-(2-hydroxypropyl)-4-benzothiazolecarboxamide and the like;

those products prepared from arylamines such as 2-chloro-N-phenyl-5-benzothiazolecarboxamide,
2-chloro-N-(o-chlorophenyl)-4-benzothiazolecarboxamide,
2-chloro-N-(m-chlorophenyl)-6-benzothiazolecarboxamide,
2-chloro-N-(p-chlorophenyl)-7-benzothiazolecarboxamide,
2-chloro-N-(o-tolyl)-4-benzothiazolecarboxamide,
2-chloro-N-(o-methoxyphenyl)-5-benzothiazolecarboxamide, and the like;

those products prepared from aralkylamines such as 2-chloro-N-benzyl-4-benzothiazolecarboxamide,
2-chloro-N-phenethyl-5-benzothiazolecarboxamide, and the like;

those products prepared from N-aryl-N-alkylamines such as 2-chloro-N-methyl-N-phenyl-4-benzothiazolecarboxamide,
2-chloro-N-ethyl-N-phenyl-5-benzothiazolecarboxamide,
2-chloro-N-phenyl-N-propyl-6-benzothiazolecarboxamide,
2-chloro-N-phenyl-N-isopropyl-7-benzothiazolecarboxamide,
2-chloro-N-butyl-N-phenyl-5-benzothiazolecarboxamide,
2-chloro-N-isobutyl-N-phenyl-4-benzothiazolecarboxamide,
2-chloro-N-sec-butyl-N-phenyl-6-benzothiazolecarboxamide,
2-chloro-N-tert-butyl-N-phenyl-7-benzothiazolecarboxamide,
2-chloro-N-amyl-N-phenyl-5-benzothiazolecarboxamide and the like;

those products prepared from N-aryl-N-hydroxyalkylamines such as 2-chloro-N-(2-hydroxyethyl)-N-phenyl-4-benzothiazolecarboxamide,
2-chloro-N-(2-hydroxypropyl)-N-phenyl-5-benzothiazolecarboxamide,
2-chloro-N-(3-hydroxypropyl)-N-phenyl-6-benzothiazolecarboxamide,
2-chloro-N-(3-hydroxybutyl)-N-phenyl-7-benzothiazolecarboxamide,
2-chloro-N-(2-hydroxy-1-methylpropyl)-N-phenyl-5-benzothiazolecarboxamide,
2 - chloro-N-(4-hydroxybutyl)-N-phenyl-4-benzothiazolecarboxamide and the like;

those products prepared from N-hydroxyalkyl-N-dialkylaminoalkylamines such as 2-chloro-N-(2-dimethylaminoethyl)-N-(2-hydroxyethyl)-5-benzothiazolecarboxamide,
2 - chloro - N - (2-dimethylaminoethyl)-N-(2-hydroxyethyl)-4-benzothiazolecarboxamide, and the like;

those products prepared from N-aryl-N-dialkylaminoalkylamines such as 2-chloro-N-(2-dimethylaminoethyl)-N-phenyl-5-benzothiazolecarboxamide,
2-chloro-N-(2-diethylaminoethyl)-N-phenyl-4-benzothiazolecarboxamide and the like;

those products prepared from N,N-diarylamines such as 2-chloro-N,N-diphenyl-4-benzothiazolecarboxamide,
2-chloro-N,N-diphenyl-6-benzothiazolecarboxamide, and the like;

and those products prepared from 5 or 6-membered heterocyclic compounds containing an acylatable ring nitrogen atom, said ring nitrogen becoming the nitrogen atom of the carbamoyl group such as 2-chloro-4-piperidinocarbonylbenzothiazole,
2-chloro-7-thiomorpholinocarbonylbenzothiazole,
2-chloro-6-morpholinocarbonylbenzothiazole,
2-chloro-7-thiomorpholinocarbonylbenzothiazole,
2-chloro-4-(1-piperazinyl)-carbonylbenzothiazole,
2-chloro-5-(N-methyl-1-piperazinyl)-carbonylbenzothiazole,
2-chloro-6-(1-imidazolyl)-carbonylbenzothiazole,
2-chloro-7-[1-(2-imidazolinyl)]-carbonylbenzothiazole,
2-chloro-6-[1-(4-imidazolinyl)]-carbonylbenzothiazole,
2-chloro-5-(1-imidazolidinyl)-carbonylbenzothiazole,
2-chloro-4-(1-pyrrolyl)-carbonylbenzothiazole,
2-chloro-5-(3-oxazolinyl)-carbonylbenzothiazole,
2-chloro-5-(3-oxazolidinyl)-carbonylbenzothiazole,
2-chloro-4-(3-thiazolinyl)-carbonylbenzothiazole,
2-chloro-7-(3-thiazolidinyl)-carbonylbenzothiazole.

Other products, having the carbamoyl group at an alternative 4, 5, 6 or 7-ring position, are prepared by selecting the corresponding 4, 5, 6 or 7-carbonyl chloride compound.

The compounds of this invention are prepared from reagents that are brought into contact usually in solution. Individual solutions of the benzothiazolecarbonyl halide and an amino compound, having a substitutable hydrogen attached to the nitrogen atom are prepared in a solvent.

The solutions are combined by adding the solution of the amino compound dropwise, with stirring to the solution of the carbonyl halide, over an interval of 1 hour or less. Stirring is continued and the temperature is allowed to rise to room temperature. After allowing time for the reaction to take place, usually less than 8 hours and preferably up to 3 hours, the solution is washed with water, dried over sodium sulfate or the like and concentrated, preferably under reduced pressure at room temperature. After concentration the carboxamide reaction product is recovered by crystallization from a suitable solvent such as hexane, methyl cyclohexane, acetonitrile, methanol, ethanol, benzene, toluene, ethyl acetate, and the like.

The 2-chlorobenzothiazolecarbonyl halide reactant is prepared by forming 2-mercaptobenzothiazolecarboxylic acid, mixing phosphorous pentachloride and phosphorous oxychloride with the carboxylic acid and adding dropwise to that mixture dimethylformamide. The resulting mixture is heated at reflux for up to 4 hours with stirring and then concentrated under reduced pressure. The residue is extracted with hot benzene and concentrated to yield the desired 2-chlorobenzothiazole carbonyl halide.

Specifically, the 2-chloro-4-benzothiazolecarbonyl chloride is prepared from known materials as follows:

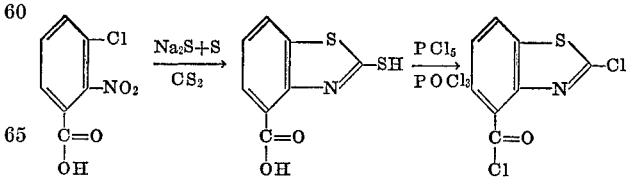

The 2-chloro 5, 6 and 7-benzothiazolecarbonyl chlorides are known.

Specific examples of the 2-halobenzothiazolecarbonyl halide reactants employed in preparing the compounds of this invention are 2-chloro-4-benzothiazolecarbonyl chloride, 2-chloro-5-benzothiazolecarbonyl chloride, 2-chloro-6-benzothiazolecarbonyl chloride, and 2-chloro-7-benzothiazolecarbonyl chloride.

The amino reactants employed in preparing the compounds of this invention are well known primary or secondary amino compounds of the general formula $R_1$—NH—$R_2$ where $R_1$ and $R_2$ are hydrogen, alkyl, cycloalkyl, alkenyl, hydroxyalkyl, alkoxyalkyl, dialkylaminoalkyl, aryl, aralkyl, or where $R_1$ and $R_2$ are joined, five or six membered heterocyclic compounds containing an acylatable ring nitrogen atom, said ring nitrogen becoming the nitrogen atom of the carbamoyl group. Preferred are compounds where $R_1$ and $R_2$ are hydrogen, loweralkyl, cycloalkyl having 4–8 carbons, loweralkenyl, hydroxyloweralkyl, loweralkoxy loweralkyl, diloweralkylaminoloweralkyl and aryl and loweraralkyl each having 6–10 carbons and the above-mentioned heterocyclics. Particularly preferred are diloweralkyl amines such as dimethylamine, diethylamine, and the like.

The novel compounds of this invention effectively inhibit acid secretion for a period of hours. For this reason the chlorobenzothiazole carboxamides of this invention have special value in the prophylaxis and treatment of peptic ulcers. While the preferred dose is a function of the specific compound used and the individual requirements, generally the compounds of this invention are administered in a total daily dose of from about 5–5000 mg., the preferred dose level being from about 10–1000 mg. At the recommended doses these compounds have a very faborable therapeutic ratio.

As the compounds contemplated within the scope of this invention are effective upon oral administration, they can be compounded in any suitable oral dosage form, as in tablet, capsule, suspension, or other liquid or solid form that can be prepared by procedures well known in the art. Thus, these novel compounds may be admixed with a suitable diluent such as lactose, and encapsulated; or they may be combined with suitable binding agents and expanding agents and compressed into tablet form. In addition, a liquid pharmaceutical may be obtained by dissolving or suspending the novel compounds of this invention in a suitable flavored vehicle. The oral route is preferred.

Typical formulations for preparing tablets, capsules, and liquids containing the novel 2-chlorobenzothiazolecarboxamides are described below. It should be recognized by one skilled in the art that the formulations represent only one of many methods for making the desired pharmaceutical composition. Factors such as the desired size of the tablet or capsule are a determining factor as to the amount of diluent required. The type of diluent is determined by the hardness of the tablet desired, or whether it is to be made by the wet, dry, or direct compression method. Also to be considered is whether other active ingredients are to be included in the formulation, such as antacids or materials which may be of benefit in controlling hypergastric acidity in a secondary manner, such as the barbiturates and tranquilizers and the like.

Tablet containing 25 mg. of 2-chloro-N,N-dimethyl-5-benzothiazolecarboxamide

|  | Each tablet, mg. | 1,000 tablets, gm. |
| --- | --- | --- |
| 2-chloro-N,N-dimethyl-5-benzothiazolecarboxamide | 25 | 25 |
| Starch | 20 | 20 |
| Lactose (powder) | 20 | 20 |
| Talc | 5 | 5 |
| Wt. of granulation | 70 | 70 |

Mix all of the ingredients and compress into slugs. The slugs are then ground to form granules that pass through a 14–16 mesh screen. The granules are then recompressed into tablets, using a suitable compression mold to form tablets, each weighing 70 mg.

Capsule containing 50 mg. of 2-chloro-N,N-dimethyl-5-benzothiazolecarboxamide

|  | Mg. |
| --- | --- |
| 2 - chloro - N,N - dimethyl - 5 - benzothiazolecarboxamide | 50 |
| Lactose | 150 |
|  | 200 |

The ingredients are mixed to evenly distribute the active ingredient throughout the lactose. The powder is packed into No. 2 empty gelatin capsules. Each capsule has a net weight of 200 mg.

To determine the effectiveness of the novel compounds of this invention in reducing gastric acid secretion, a test is given whereby the gastric acid inhibiting effect of compounds is determined. The test method is as follows:

The test drug is administered orally to fasting male Holtzman rats weighing 120–150 gms., one half hour prior to pyloric ligation. A similar group of animals are used as a test control, no drug being administered. Two hours after ligation, the animals are sacrificed, the stomachs removed and the contents carefully collected in a graduated centrifuge tube. Material is centrifuged, the supernate liquid decanted, measured, and titrated to a pH of 7.0 with 0.01 normal sodium hydroxide to give a reading in milliequivalents per liter of hydrochloric acid present.

The amount of gastric acid in terms of hydrochloric acid from the treated animals at a given dose is compared to the amount of acid secreted by the untreated animal, and the difference expressed as percent inhibition based on the acid output of untreated controls.

When the compounds of this invention are tested by the above procedure, they are effective for inhibiting gastric acid output. For example, the N,N-dimethyl and N,N-diethyl-2-chloro-5-benzothiazolecarboxamides when administered at 32 mg./kg. inhibited acid output 92% and 82% respectively.

EXAMPLE 1

2-chloro-4-benzothiazolecarbonyl chloride (A) 2-mercapto-4-benzothiazolecarboxylic acid. — A solution of 8.0 g. (0.04 mole) of 3-chloro-2-nitrobenzoic acid in 50 ml. of 1 N sodium hydroxide is added to a polysulfide solution [28.8 g. (0.12 mole) of $Na_2S$—$9H_2O$ and 9.6 g. (0.30 mole) of sulfur dissolved in 30 ml. of water] and the mixture is stirred under reflux for 5½ hours. It is cooled to 40° C., carbon disulfide (6.0 g.; 0.08 mole) is added, and the mixture is stirred for 20 hours at 40–45° C. The reaction mixture is cooled to 0–5° C. and neutralized with glacial acetic acid. A solid product is collected, washed with water and then added to 100 ml. of saturated $Na_2CO_3$ solution. Insoluble material is removed by filtration and the filtrate is acidified with glacial acetic acid. Crystalline 2-mercapto-4-benzothiazolecarboxylic acid precipitates (0.86 g.), and is collected M.P. 297–299° C.

(B) 2-chloro-4-benzothiazolecarbonyl chloride. — Dimethylformamide (3.5 g.; 0.048 mole) is added dropwise to a stirred mixture of 2-mercapto-4-benzothiazolecarboxylic acid (1.68 g.; 0.008 mole), phosphorus pentachloride (5.0 g.; 0.024 mole), and phosphorus oxychloride (30.6 g.; 0.20 mole). The resulting solution is heated under reflux for 2½ hours and then concentrated under reduced pressure at steam bath temperatures. The semisolid residue is extracted with several 25 ml. portions of hot benzene. The extracts are combined and concentrated to yield 1.46 g. of 2-chloro-4-benzothiazolecarbonyl chloride, M.P. 129.5–133° C.

EXAMPLE 2

Preparation of 2-chloro-6-benzothiazolecarbonyl chloride (A) 2-mercapto-6-benzothiazolecarboxylic acid.—Carbon disulfide, 3.1 parts, is added to a solution of 3.8 parts of 3-mercapto-4-aminobenzoic acid hydrochloride in 30 parts of 75% ethyl alcohol. The mixture is refluxed 12 hours, cooled to 10° C. and adjusted to pH 4 with acetic acid to give 2-mercapto-6-benzothiazole carboxylic acid.

(B) 2 - chloro-6-benzothiazolecarbonyl chloride.—A mixture of 3.5 parts of 2-mercapto-6-benzothiazolecarboxylic acid, 11 parts phosphorus pentachloride, 70 parts phosphorus oxychloride, and 8 parts dimethylformamide is prepared and stirred for three hours. Excess phosphorus oxychloride is removed by distillation and the residue is extracted with benzene. The extract is evaporated in vacuo and the residue recrystallized from ligroin to give 2-chloro-6-benzothiazolecarbonyl chloride, M.P. 151° C.

The 5-carbonyl and 7-carbonyl compounds are similarly prepared from the appropriate benzoic acids.

EXAMPLE 3

2-chloro-5-benzothiazolecarboxamide

A solution of 0.01 mole of 2-chloro-5-benzothiazolecarbonyl chloride in 50 ml. of chloroform is cooled to 5° C. and 0.02 mole of anhydrous ammonia (in 25 ml. of chloroform) is added dropwise, with stirring, over a 5 to 10 minute period. The mixture is stirred for 1½ hours and allowed to warm to room temperature. Solid precipitates from the reaction mixture and is collected by filtration, washed with water and recrystallized from dimethylformamide-isopropyl alcohol mixture to yield 2-chloro-5-benzothiazolecarboxamide.

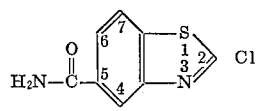

M.P. 244.5–246° C.; dec.

EXAMPLE 4

2-chloro-N-methyl-4-benzothiazolecarboxamide

A solution of 0.0063 mole of 2-chloro-4-benzothiazolecarbonyl chloride in 25 ml. of chloroform is cooled to 5° C. and 0.0126 mole of methylamine (in 5 ml. of chloroform) is added dropwise, with stirring, over a 10 minute period. Stirring is continued for 1¼ hours during which time the mixture temperature is allowed to rise to room temperature (about 25° C.). The mixture is washed with water, dried over sodium sulfate and concentrated under reduced pressure at room temperature. 2-chloro-N-methyl-4-benzothiazolecarboxamide is obtained as a solid and is recrystallized from methanol-water mixture, M.P. 104.5–106° C.

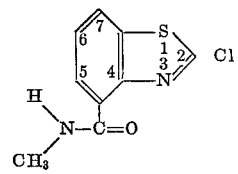

EXAMPLE 5

2-chloro-N-methyl-5-benzothiazolecarboxamide

A mixture of 0.025 mole of 2-chloro-5-benzothiazolecarbonyl chloride and 100 ml. of chloroform is prepared and cooled to about 5° C. Methylamine (0.05 mole in 50 ml. of chloroform) is added dropwise with stirring over a 10 minute period. Stirring is continued for 1½ hours during which time the temperature approaches room temperature. The mixture is washed with water, dried over sodium sulfate and concentrated under reduced pressure at room temperature. The solid obtained is recrystallized from toluene to yield 2-chloro-N-methyl-5-benzothiazolecarboxamide, M.P. 172.5–173.5° C.

EXAMPLE 6

2-chloro-N-methyl-6-benzothiazolecarboxamide 2-chloro-6-benzothiazolecarbonyl chloride (0.01 mole) and 75 ml. chloroform are mixed and cooled as in Example 5. A solution of 0.02 mole of methylamine in 25 ml. of chloroform is slowly added and the reaction mixture is processed as in Example 5 to yield 2-chloro-N-methyl-6-benzothiazolecarboxamide, M.P. 190.5–191.5° C.

EXAMPLE 7

2-chloro-N-methyl-7-benzothiazolecarboxamide

A mixture of 0.02 mole of 2-chloro-7-benzothiazolecarbonyl chloride is prepared with 100 ml. of chloroform and cooled to about 5° C. A solution of 0.04 mole of methylamine in 30 ml. of chloroform is slowly added over a 5 minute period, with constant stirring. The mixture is stirred for one hour and a precipitate is collected by filtration and washed with water. The filtrate is washed with water, dried over sodium sulfate, and concentrated under reduced pressure at room temperature. The solid residue and the precipitate are combined and recrystallized from ethyl acetate to yield 2-chloro-N-methyl-7-benzothiazolecarboxamide, M.P. 186–187.5° C.

EXAMPLE 8

2-chloro-N-ethyl-5-benzothiazolecarboxamide 2-chloro-5-benzothiazolecarbonyl chloride (0.025 mole) is mixed with 100 ml. of chloroform and cooled to about 5° C. A solution of 0.05 mole of ethylamine in 30 ml. of chloroform is added dropwise with stirring over a 10 minute period. Stirring is continued for 2 hours while the temperature is allowed to approach room temperature. The mixture is washed with water, dried and concentrated under reduced pressure. The solid obtained is recrystallized from butyl chloride to yield 2-chloro-N-ethyl-5-benzothiazolecarboxamide, M.P. 150.5–152° C.

EXAMPLE 9

2-chloro-N-isoamyl-5-benzothiazolecarboxamide

A solution of 0.01 mole of 2-chloro-5-benzothiazolecarbonyl chloride in 60 ml. of chloroform is cooled to 5° C. and 0.02 mole of isoamylamine is added dropwise with stirring over a 15 minute period. Stirring is continued for two hours at about room temperature. The mixture is then washed, dried and concentrated. Recrystallization from butyl chloride gives 2-chloro-N-isoamyl-5-benzothiazolecarboxamide, M.P. 104–107° C.

EXAMPLE 10

2-chloro-N,N-dimethyl-5-benzothiazolecarboxamide

A solution of 0.025 mole of 2-chloro-5-benzothiazolecarbonyl chloride in 100 ml. chloroform is cooled to 5° C. and 0.05 mole of dimethylamine (in 50 ml. of chloroform) is added dropwise with stirring over a 10 minute period. Stirring is continued for 1½ hours at about room temperature and the mixture is washed with water, dried and concentrated. The solid obtained is recrystallized from ethanol to give 2-chloro-N,N-dimethyl-5-benzothiazole-carboxamide, M.P. 115.5–117° C.

EXAMPLE 11

2-chloro-N,N-dimethyl-6-benzothiazolecarboxamide 2-chloro-6-benzothiazolecarbonyl chloride (0.01 mole) is dissolved in 75 ml. chloroform. To this a solution of 0.02 mole of dimethylamine in 25 ml. of chloroform is added with stirring over a 5 minute period. Stirring is continued for 1 hour at about 25° C. The mixture is then washed with water, dried over sodium sulfate and concentrated under reduced pressure at room temperature. A pale yellow liquid is obtained which crystallizes upon standing. Recrystallization from methylcyclohexane gives 2-chloro-N,N-dimethyl-6-benzothiazolecarboxamide, M.P. 73.5–75.5° C.

Alternatively to employing two moles of amine for each mole of carbonylchloride, other suitable bases, non-reactive with the acid halide, may be used to neutralize liberated acid. These include trialkyl amines such as triethylamine, N-methylpiperidine, inorganic bases such as sodium bicarbonate, potassium bicarbonate, and the like. For example: 2-chloro-6-benzothiazolecarbonyl chloride (0.0057 mole) is dissolved in 50 ml. of chloroform. A solution of 0.0057 mole of dimethylamine in 15 ml. of chloroform is added with stirring over a 5 minute period. To this is added 0.0057 mole of triethylamine. Stirring is continued for 1 hour at about 25° C. The 2-chloro-N,N-dimethyl-6-benzothiazole-carboxamide product is isolated from the reaction mixture and purified by the procedure of Example 11.

EXAMPLE 12

2-chloro-N,N-dimethyl-7-benzothiazolecarbonyl chloride

A mixture of 2 - chloro - 7 - benzothiazolecarboxamide (0.02 mole) with 100 ml. chloroform is prepared and cooled to 5° C. A solution of 0.04 mole of dimethylamine in 25 ml. of chloroform is added dropwise with stirring, over a 5 minute period. Stirring is continued for 1 hour while maintaining the temperature about 25° C. The mixture is then washed with water, dried over sodium sulfate and concentrated to produce a liquid, which solidifies when treated with cold petroleum ether. Recrystallization from cyclohexane gives 2-chloro-N,N-dimethyl-7-benzothiazolecarboxamide, M.P. 74–76.5° C.

EXAMPLE 13

2-chloro-N,N-diethyl-5-benzothiazolecarboxamide

A solution of 0.025 mole of 2-chloro-5-benzothiazolecarbonyl chloride in 75 ml. of chloroform is cooled to 5° C. and 0.05 mole of diethylamine (in 25 ml. of chloroform) is added dropwise, with stirring, over a 15 minute period. Stirring is continued for 2¼ hours during which time the mixture temperature is allowed to rise to room temperature. The mixture is then washed with water, dried over sodium sulfate and concentrated. A liquid is obtained that is triturated with cold hexane to yield 2-chloro-N,N-diethyl-5-benzothiazolecarboxamide, M.P. 70.5–72.5° C.

When isopropylamine, propylamine, cyclohexylamine, butylamine, hexylamine, dipropylamine, allylamine, propyl butylamine, dipropenylamine or dihexylamine is employed as the amine of Examples 8–13 there is obtained the corresponding N-isopropyl-, N-propyl-, N-cyclohexyl-, N,N-dipropenyl-, N-butyl-, N-hexyl-, N,N-dipropyl-, N-allyl-, N-propyl-N-butyl-, or N,N-dihexyl-2-chlorobenzothiazolecarboxamide.

EXAMPLE 14

2-chloro-N-(2-dimethylaminoethyl)-5-benzothiazolecarboxamide

An equal molar amount of 2-dimethylaminoethyl amine is added dropwise to 2-chloro-5-benzothiazolecarbonyl chloride (0.01 mole) dissolved in 55 ml. chloroform. The amine is added dropwise over a 10-minute period, with stirring. Stirring is continued for 2 hours during which time the mixture temperature is allowed to rise to about room temperature. The solvent is removed under reduced pressure. The residual hydrochloride salt is recrystallized from acetonitrile to give the hydrochloric acid salt of 2 - chloro-N-(2-dimethylaminoethyl)-5-benzothiazolecarboxamide, M.P. 177.5–178.5° C.

When the 2-chloro-4, 6, or 7-benzothiazolecarbonyl chloride is employed the corresponding 2-chloro-N-dialkylaminoalkyl-4, 6 or 7-benzothiazolecarboxamide is pyl amine or 6-dimethylaminohexyl amine there is obtained 2-chloro-N-(2-diethylaminoethyl)-5-benzothiazolecarboxamide,
2-chloro-N-(2-dipropylaminoethyl)-5-benzothiazolecarboxamide,
2-chloro-N-(2-dihexylaminoethylamine)-5-benzothiazolecarboxamide,
2-chloro-N-(3-dimethylaminopropyl)-5-benzothiazolecarboxamide or
2-chloro-N-(6-dimethylaminohexyl)-5-benzothiazolecarboxamide.

When the 2-chloro-4, 6, or 7 - benzothiazolecarbonyl chloride is employed the corresponding 2-chloro-N-dialkylaminoalkyl-4, 6 or 7-benzothiazolecarboxamide is obtained.

EXAMPLE 15

2-chloro-N-phenyl-7-benzothiazolecarboxamide

A solution of 0.01 mole of 2-chloro-7-benzothiazolecarbonyl chloride in 50 ml. of chloroform is cooled to about 5° C. and 0.02 mole of aniline (in 5 ml. of chloroform) is added dropwise, with stirring, over a 15 minute period. The mixture is stirred for 2 hours during which time the temperature is allowed to rise to room temperature. The mixture is then washed, dried over sodium sulfate and concentrated. The solid obtained is recrystallized from butyl chloride to give 2-chloro-N-phenyl-7-benzothiazolecarboxamide, M.P. 169.5–173° C.

When benzylamine, o-, m-, or p-toluidine, N-methyl-p-toluidine, m-chloroaniline, o-anisidine, phenethylamine or 2,4-xylidine is substituted for aniline in Example 15 there is obtained 2-chloro-N-benzyl-7-benzothiazolecarboxamide,
2-chloro-N-(o-, m- or p-tolyl)-7-benzothiazolecarboxamide,
2-chloro-N-methyl-N-(p-tolyl)-7-benzothiazolecarboxamide,
2-chloro-N-(m-chlorophenyl)-7-benzothiazolecarboxamide,
2-chloro-N-(o-methoxyphenyl)-7-benzothiazolecarboxamide,
2-chloro-N-phenethyl-7-benzothiazolecarboxamide, or
2-chloro-N-(2,4-xylyl)-7-benzothiazolecarboxamide.

When 2-chloro-4, 5 or 6-benzothiazolecarbonyl chloride is employed there is obtained the corresponding 2-chloro-N-aryl or aralkyl-4, 5 or 6-benzothiazolecarboxamide.

EXAMPLE 16

2-chloro-7-morpholinocarbonylbenzothiazole 2-chloro-7-benzothiazolecarbonyl chloride (0.005 mole) is dissolved in 30 ml. of chloroform and cooled to 5° C. Morpholine (0.01 mole) is added dropwise and with stirring to the solution over a 5 minute period. Stirring is continued for one hour at a temperature of about 20° C. The chloroform solution is washed, dried and concentrated to give a solid product which is crystallized from ethanol to yield 2-chloro-7-morpholino-carbonyl-benzothiazole, M.P. 154–156.5° C.

When pyrrolidine, piperidine, thiomorpholine, piperazine, N-methylpiperazine, imidazole, imidazoline, imidazolidine, pyrrole, oxazoline, oxazolidine, thiazoline or thiazolidine is substituted for the morpholine in Example 16, there is obtained:

2-chloro-7-pyrrolidinocarbonylbenzothiazole,
2-chloro-7-piperidinocarbonylbenzothiazole,
2-chloro-7-thiomorpholinecarbonlybenzothiazole,
2-chloro-7-piperazinocarbonylbenzothiazole,
2-chloro-7-(N-methylpiperazino)carbonylbenzothiazole,
2-chloro-7-imidazolylcarbonylbenzothiazole,
2-chloro-7-[1-(2-imidazolinyl)]carbonylbenzothiazole,
2-chloro-7-[1-(3-imidazolinyl)]carbonylbenzothiazole,
2-chloro-7-[-1-(4-imidazolinyl)]carbonylbenzothiazole,
2-chloro-7-imidazolidinylcarbonylbenzothiazole,
2-chloro-7-pyrrolylcarbonylbenzothiazole,
2-chloro-7-[3-(4-oxazolinyl)]carbonylbenzothiazole,
2-chloro-7-oxazolidinylcarbonylbenzothiazole,
2-chloro-7-[3-(4-thiazolinyl)]carbonylbenzothiazole, or
2-chloro-7-thiazolidinylcarbonylbenzothiazole.

When 2-chloro-4, 5 or 6-benzothiazolecarbonyl chloride is employed there is obtained the corresponding 2-chloro-4, 5 or 6-heterocyclocarbonylbenzothiazole.

EXAMPLE 17

2-chloro-N-(2-hydroxyethyl)-5-benzothiazole-carboxamide

A solution of 0.01 mole of 2-chloro-5-benzothiazolecarbonyl chloride is prepared in 50 ml. of chloroform. 0.01 mole of 2-aminoethanol is added dropwise, with stirring, over a 5 minute period, this is followed by 0.01 mole of triethylamine. After addition is completed the mixture is stirred for ½ hour. Water is added to the reaction and the mixture is filtered, the solid obtained is recrystallized from toluene to yield 2 - chloro-N-(2-hydroxyethyl)-5-benzothiazolecarboxamide, M.P. 153–155° C.

EXAMPLE 18

2-chloro-N-(2-hydroxyethyl)-6-benzothiazole-carboxamide 2-chloro-6-benzothiazolecarbonyl chloride, 2 - aminoethanol, and triethylamine, 0.01 mole of each, are allowed to react under the conditions of Example 17. The mixture is stirred for 1 hour, at room temperature. A portion of the product precipitates and is isolated by filtration and washed with water. The filtrate is washed with water, dried over sodium sulfate and concentrated under reduced pressure at room temperature. The solid obtained is combined with the above product and recrystallized from acetonitrile to yield 2-chloro-N-(2-hydroxyethyl)-6-benzothiazolecarboxamide, M.P. 138–140.5° C.

EXAMPLE 19

2-chloro-N-(2-hydroxyethyl)-7-benzothiazole-carboxamide

A solution of 0.02 mole of 2-chloro-7-benzothiazolecarbonyl chloride is cooled in 50 ml. of chloroform to 5° C. and 0.04 mole of 2-aminoethanol (in 50 ml. of chloroform) is added dropwise, with stirring, over a 10 minute period. Stirring is continued for 1¾ hours at room temperature. Solid product precipitates from the reaction mixture. It is collected by filtration, washed with water and recrystallized from acetonitrile. The filtrate is further treated as in Example 18 and additional solid 2-chloro-N-(2-hydroxyethyl)-7-benzothiazolecarboxamide is recovered, M.P. 153–155.5° C.

EXAMPLE 20

2-chloro-N-(2-hydroxyethyl)-N-methyl-5-benzothiazole-carboxamide 2-chloro - 5 - benzothiazolecarbonyl chloride (0.025 mole) is mixed with 100 ml. of chloroform and cooled to 5° C. To this mixture is added 0.05 mole of methylaminoethanol dropwise over a 10 minute period with stirring. Stirring is continued for 2 hours at room temperature. The mixture is washed with water, dried and concentrated. The oil obtained solidifies upon standing. Recrystallization from butyl chloride gives 2-chloro-N-(2-hydroxyethyl)-N-methyl - 5 - benzothiazolecarboxamide, M.P. 84–86° C.

When 2-aminoethanol is replaced by 3-aminopropanol, 1-amino-2-butanol, 4-aminobutanol or 5-aminopentanol there is obtained the corresponding N-(3-hydroxypropyl)-, N-(2-hydroxybutyl)-, N-(4-hydroxybutyl)-, or 2-chloro-N-(5-hydroxypentyl)-5-benzothiazolecarboxamide.

What is claimed is:
1. A compound of the formula

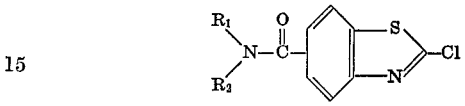

in which $R_1$ and $R_2$ are each the same or different radicals selected from the group consisting of hydrogen, loweralkyl, cycloalkyl of 5 or 6 carbon atoms, loweralkenyl of 2 to 4 carbon atoms, hydroxyloweralkyl, diloweralkylaminoloweralkyl, tolyl, xylyl, phenyl, p-chlorophenyl, benzyl, phenethyl, p-chlorobenzyl, 2-phenylpropyl, or $R_1$ and $R_2$ together are joined to form a heterocyclic ring containing the nitrogen of the carbamoyl moiety which heterocyclic ring is pyrrolidino, piperidino, morpholino, thiomorpholino, piperazino, N-methylpiperazino, imidazolyl, imidazolinyl, imidazolidinyl, pyrrolyl, oxazolinyl, oxazolidinyl, thiazolinyl, and thiazolidinyl.

2. The compound of claim 1 in which $R_1$ and $R_2$ are loweralkyl.

3. The compound of claim 1 of the formula

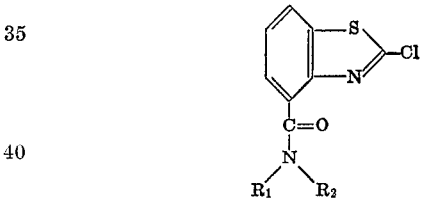

in which the carbamoyl radical is attached to the 4-ring position.

4. The compound of claim 3 in which no more than one of $R_1$ and $R_2$ is hydrogen.

5. The compound of claim 1 of the formula

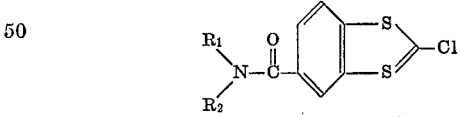

in which the carbamoyl radical is attached to the 5 ring position.

6. The compound of claim 5 in which no more than one of $R_1$ and $R_2$ is hydrogen.

7. The compound of claim 5 in which $R_1$ is loweralkyl.

8. The compound of claim 7 in which $R_2$ is loweralkyl.

9. The compound of claim 8 in which $R_1$ and $R_2$ are the same loweralkyl radical having 1 or 2 carbon atoms.

10. The compound of claim 1 of the formula

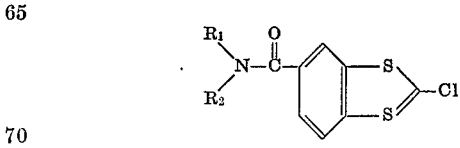

in which the carbamoyl radical is attached to the 6 ring position.

11. The compound in claim 10 in which no more than one of $R_1$ and $R_2$ is hydrogen.

12. The compound of claim 1 of the formula

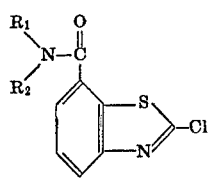

in which the carbamoyl radical is attached to the 7 ring position.

13. The compound of claim 12 in which no more than one of $R_1$ and $R_2$ is hydrogen.

14. The compound of claim 5 which is 2-chloro-N,N-dimethyl-5-benzothiazolecarboxamide.

15. The compound of claim 5 which is 2-chloro-N,N-diethyl-5-benzothiazolecarboxamide.

References Cited

Morrison et al., "Organic Chemistry" Allyn & Bacon (1959), p. 474.

ALEX MAZEL, Primary Examiner

R. V. RUSH, Assistant Examiner

U.S. Cl. X.R.

260—243 B, 247.1, 268 C, 293.4 E; 424—246, 248, 250, 267, 270